(12) United States Patent
Berenbaum et al.

(10) Patent No.: US 7,917,716 B2
(45) Date of Patent: Mar. 29, 2011

(54) MEMORY PROTECTION FOR EMBEDDED CONTROLLERS

(75) Inventors: Alan D. Berenbaum, New York, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 826 days.

(21) Appl. No.: 11/848,808

(22) Filed: Aug. 31, 2007

(65) Prior Publication Data

US 2009/0063799 A1    Mar. 5, 2009

(51) Int. Cl.
*G06F 12/14* (2006.01)
*G06F 9/24* (2006.01)

(52) U.S. Cl. .............. 711/163; 711/E12.091; 713/2; 713/193

(58) Field of Classification Search .............. None
See application file for complete search history.

(56) References Cited

U.S. PATENT DOCUMENTS

| | | | |
|---|---|---|---|
| 5,535,409 A * | 7/1996 | Larvoire et al. | 726/28 |
| 6,151,678 A | 11/2000 | Davis | |
| 2006/0129848 A1 | 6/2006 | Paksoy et al. | |
| 2007/0006150 A9 | 1/2007 | Walmsley | |
| 2007/0022243 A1 * | 1/2007 | Rudelic | 711/103 |
| 2007/0260836 A1 * | 11/2007 | Rudelic | 711/163 |
| 2008/0082771 A1 * | 4/2008 | Pong | 711/163 |
| 2008/0114958 A1 * | 5/2008 | Jogand-Coulomb et al. | 711/164 |

FOREIGN PATENT DOCUMENTS

JP    09054725 A  *  2/1997

OTHER PUBLICATIONS

Machine translation of JP 09054725A, 6 pages, published 1997.*

* cited by examiner

*Primary Examiner* — Kaushikkumar Patel
(74) *Attorney, Agent, or Firm* — Meyertons Hood Kivlin Kowert & Goetzel, P.C.; Jeffrey C. Hood; Mark S. Williams

(57) ABSTRACT

System and method for protecting data in a system including a main processor, an embedded controller, and a memory. In response to a power-on-reset (POR), access to the memory is enabled, e.g., access by the embedded controller. First data is read from the memory (e.g., by the embedded controller) in response to the enabling, where the first data are usable to perform security operations for the system prior to boot-up of the main processor. The first data are used, e.g., by the embedded controller, to perform one or more security operations for the system, then access to the memory, e.g., by the embedded controller, is disabled, where after the disabling the memory is not accessible, e.g., until the next POR initiates enablement.

25 Claims, 5 Drawing Sheets

MEMORY PROTECTION FOR EMBEDDED CONTROLLERS

BACKGROUND OF THE INVENTION

1. Field of the Invention

This invention relates generally to the field of computing devices, and more specifically to protecting memory, e.g., data and/or program instructions, e.g., in a system-on-chip included in a computer system.

2. Description of the Related Art

Many hardware systems include a central processing unit (CPU), i.e., a main or host processor, and one or more embedded controllers for performing auxiliary functions for the system, such as initialization, input/output (I/O), management, and reset functionality. For example, an embedded controller may be part of a system-on-chip (SoC) that may also include various additional components that coupled to the embedded controller, e.g., memory, etc. Such systems may be vulnerable to unauthorized access or tampering by malicious users or external agents, e.g., during system initialization prior to boot-up of the system CPU.

In some approaches to preventing such unauthorized access a "secret" is stored in a safe location, e.g., in SoC memory, and used via software executed by the controller, e.g., to verify that the system in which the SoC is located is authorized and has not been modified through tampering, or to enable or disable some aspect, e.g., component or functionality, of the system, either based on authorization of the secret or using the secret itself to enable the function, among other uses. In most cost-sensitive designs, secrets are simply held in SoC memory and it is assumed that an attacker is either insufficiently motivated or insufficiently clever to read the secret in an unauthorized way. Approaches with less cost-sensitivity often use strong cryptographic techniques, including the use of a hardware TPM (Trusted Platform Module).

However, keeping a secret through simple obscurity may be insufficient to defend against a sufficiently dedicated attack, while hardware based solutions, such as the use of a TPM, may be too expensive. Moreover, cryptographically strong algorithms may require more computational power than an inexpensive embedded controller can provide. Thus, improved systems and methods for protecting data for an embedded controller are desired.

Other corresponding issues related to the prior art will become apparent to one skilled in the art after comparing such prior art with embodiments of the present invention as described herein.

SUMMARY OF THE INVENTION

Various embodiments are presented of a system and method for protecting data for an embedded controller in a system are presented. The system, e.g., a computer system, may include a main or host processor, and an embedded processor and memory, e.g., included in a system-on-chip (SoC), where the data are useable by the embedded controller to perform security operations, e.g., system verification, login, function or component activation, etc., prior to boot-up of the main or host processor of the system, according to one embodiment.

First, in response to a power-on-reset (POR), access to the memory may be enabled. This enablement may be accomplished via any of a variety of ways. As noted above, in one embodiment, the system may include an embedded controller, e.g., an embedded microcontroller, where controlling access to the memory comprises controlling access to the memory by the embedded controller (or other components of the system).

Access to the memory may be controlled or secured by protection logic and masking logic, examples of which are described below. In one embodiment, enabling access by the embedded controller to the memory may include providing a first control value to masking logic coupled to the memory, e.g., interposed between the embedded controller and the memory. The masking logic may be operable to perform a logical operation using the first control value and data read from the memory, where the logical operation leaves the data read from the memory unchanged. In other words, the first control value may be a "pass-through" value that does not mask data read from the memory.

As indicated above, in some embodiments, the embedded controller and the memory may be included in a System-on-Chip (Soc). For example, the embedded controller may be a peripheral device controller for a computer system, e.g., a keyboard controller. In various embodiments, the memory may be or include one or more of: random access memory (RAM), non-volatile memory, e.g., read only memory (ROM), or a register, among other types of memory. Thus, a POR may enable access to the memory, e.g., to secret data stored in the memory, although it should be noted that in other embodiments, any means or components may be used to perform the functionality described herein.

First data, e.g., the secret data, may then be read from the memory in response to the above enabling, where the first data are usable to perform security operations for the system, e.g., prior to boot-up of the main processor. The first data, e.g., secret data, may be any type of data useable by the embedded controller to perform security operations for the system. For example, in some embodiments, a vendor of such a system may, as part of the boot sequence of the SoC, wish to verify that other components of the computer system are authorized by the vendor. A method such as password or key exchange may be used, which requires storing some secret key or password on the SoC, i.e., the first data may include a key or password. Thus, for example, in some embodiments, the (secret) data may include a key or password for use in a password or key exchange for verification of system components, or a password for restricted login to the system, e.g., where a user may be required to provide a matching password to initiate boot-up of the main processor, and thus the embedded controller may prompt the user for the password, and initiate the main system boot process upon provision by the user of the correct password. Of course, in other embodiments, the first data may used in and for any security operations desired, i.e., the first data may be any type of data for which protection is desired.

Access to the memory may be disabled, where after disabling the memory is not accessible. For example, in one embodiment, disabling access may include providing a second control value to the masking logic, where the masking logic is operable to perform a logical operation using the second control value and data read from the memory, and where the logical operation masks the data read from the memory. As discussed above, in some embodiments, the system includes an embedded controller, where the masking logic is interposed between the embedded controller and the memory. Thus, in some embodiments, enabling access to the memory includes enabling access to the memory by the embedded controller, reading the first data from memory includes the embedded controller reading the first data from the memory, and disabling access to the memory includes disabling access to the memory by the embedded controller.

In one embodiment, the embedded controller using the first data to perform one or more security operations for the system may include executing initialization code for the system, and disabling access to the memory may be performed after executing the initialization code for the system.

Note that access to the memory may remain disabled until another POR, which may again cause access to the memory to be enabled, as described above. Note also that limiting access to the secret data in the manner described above may prevent unauthorized access, e.g., tampering with or circumvention of the system initialization process, e.g., by preventing any agent, internal or external, from accessing the secret data, where the secret data may be required for successful initialization of the system.

Thus, in some embodiments, the control value, which may be referred to herein as a read-protect bit (even if it includes more than a single bit of data), once set, may prevent any access to the first data, e.g., the secret, which may be stored in a portion of an on-chip memory or in a register. The control value (e.g., bit) may be cleared by POR circuitry, and can be set at any time by software. Once set, however, there is preferably no other mechanism to clear it again, other than a full power cycle of the chip, i.e., another POR. Embedded controller initialization code, which is the first code to run on the embedded controller, can use the secret and then lock it by setting the read-protect bit, before there is any opportunity for embedded controller initialization code to be modified (for example, by the host).

It should be noted, however, that embodiments of the above method may be used to implement more complex security processes. For example, in some systems, the first data, e.g., the secret, may be held in the same region of memory as initialization code for the system, e.g., in systems in which the secret is programmed into a non-volatile memory after the chip is manufactured, and the chip manufacturer does not know how much of the memory will contain the secret. Additionally, a vendor may want the initialization code itself protected from access by an attacker, since reverse engineering the code may give an attacker hints about how to obtain the secret. In such systems the above method and mechanism may need to be modified.

For example, a primary issue that may need to be addressed is that the code to write the read-protect bit may be in a read-protected region, and so the embedded controller may not be able to execute the instruction following the instruction that sets read-protect, since the above protection scheme would already be in effect. A read-protect-enable bit (or equivalent) may therefore be used, where the read-protect-enable bit (or equivalent) may be writable by software. Note that in this embodiment, the read-protect bit is preferably not writable directly by software, but instead, may be set whenever the read-protect-enable bit is set and the embedded controller executes any code outside of the protected region. As above, once set the read-protect bit cannot be cleared, except via another POR.

Accordingly, below are described embodiments of the above method for protecting initialization code, i.e., that are particularly directed to securing a specified region of memory in a system, and that utilize an extra control bit, e.g., a read-protect-enable value (e.g., a bit or equivalent valued item), to control setting of the read-protect bit. In other words, in the below embodiments, the contents of a memory, e.g., initialization code for the system, e.g., specified by a memory range, may be secured. It should be noted, however, that the embodiments described are meant to be exemplary only, and that the methods described are not limited to using any particular techniques or components, nor to any particular memory or memory contents.

As discussed above, in some embodiments, the system may include an embedded controller. Moreover, in some embodiments, the first data may include initialization code for the system, where the initialization code has an address range. Enabling access to the memory may include enabling access to the address range in the memory, and disabling access to the memory may include disabling access to the address range of the memory. Thus, in some embodiments, the initialization code may be the secret data described above (which may include one or more keys and/or passwords, as well).

In one embodiment, the above method may further include determining if an address generated by the embedded controller is outside of an initialization address range, and enabling protection of the memory in response to determining that the address generated by the embedded controller is outside of the initialization address range. Note that the enabling protection is performed prior to the disabling access, where the memory is accessible after the enabling protection and prior to the disabling access, and where the disabling access is performed for addresses generated within the initialization address range, wherein said disabling is performed after said enabling protection.

In other words, the enabling protection doesn't actually establish protection of the memory, but rather, configures the system so that under a specified condition, the protection of memory will be established (see the locked door analogy above). The disabling thus prevents the embedded controller from accessing the initialization address range after having generated at least one address outside of the initialization address range. In other words, the condition that actually triggers the disabling of access to the memory in the address range is when the embedded processor reenters the address range after having left it. Note that although access to the memory in the address range is disabled, access to the memory is enabled for addresses generated outside of the initialization address range.

In one embodiment, a read protect enable value may be set in a memory element prior to enabling protection of the memory, where setting the read protect enable value allows the enabling protection of the memory. In other words, a value, such as a bit, may be set that allows for the subsequent enablement of protection (but not the actual protection yet) for the address range. Note that this read protect enable value may be set by the embedded controller while the embedded controller is still operating within the address range. This value may thus be used to set up, or enable, the above protection enablement, which itself puts the system into condition for triggering the actual protection of memory.

Described in a slightly different manner, in one embodiment, providing the second control value to masking logic (see the disabling above) may include setting a third control value, e.g., the read-protect-enable bit mentioned above, to enable the providing the second control value, then, subsequent to setting the third control value, determining that the embedded controller is attempting to access the memory outside the address range, and generating an indication that the embedded controller is attempting to access the memory outside the address range. Access to the address range of the memory may then be disabled in response to the third control value and the indication.

Said another way, the second control value and the indication may be used to control whether and when the specified address range in memory is to be protected. More specifically, upon POR, access by the embedded controller may be enabled, e.g., so that the embedded controller may execute initialization code to check or verify system security prior to boot-up of the main processor or CPU of the system. The embedded controller may then execute (initialization code) program instructions in the specified address range, e.g., may execute some or all of the initialization code. The embedded controller may then set the second control value, e.g., the read-protect-enable bit (or functional equivalent), to enable use of the second control value, e.g., to enable setting the read-protect bit (or functional equivalent), although it should be noted that doing so does not in itself protect the memory, i.e., setting the third control value/read-protect-enable bit does not disable access to the memory, but rather, prepares or enables the system for such disabling. Then, when the embedded controller executes an instruction outside the specified range, this event, in combination with the third control value/read-protect-enable bit, may cause the second control value, e.g., the read-protect bit, to be set, disabling access to the specified address range in memory. Note that preferably, access to memory addresses outside the specified address range is not disabled. For example, in preferred embodiments, if the instruction being executed is outside the address range, the second control value may not be provided to the masking logic. Below are described embodiments of an exemplary detailed system implementing one embodiment of the above memory protection scheme.

Once access to the memory is enabled, reads from memory in the specified address range may be performed, e.g., initialization code program instructions in the specified address range may be read and executed, e.g., by the embedded controller.

A comparator may be operable to determine when a program instruction is out of the specified address range, and generate an indication thereof. More specifically, the comparator may be operable to receive an embedded controller program instruction address, and the specified address range of the initialization code, and generate an indication as to whether the address is in or out of the specified range. Setting this third control value may allow the system to subsequently protect the memory, e.g., when the comparator determines that the address is out of range.

Thus, upon POR, e.g., start-up or reset, access to the memory may be enabled, e.g., allowing the embedded controller to execute initialization code instructions from a specified address range, e.g., to perform any of various security operations. Then, in response to both a read-protect-enable bit being set and encountering a program instruction with an address outside the specified range, access to the memory within the specified range may be disabled, although access to instructions with addresses outside this range may still be accessed. Access to the specified range may only be enabled by another POR.

In one use of this mechanism, the embedded controller, while executing within the initialization block, may set the read-protect-enable bit. The next instruction, which is still within the initialization block range, may be a jump to a location that is outside the initialization block range. Once the jump is executed the initialization block may be locked or protected. Note that without the read-protect-enable bit being set, the embedded controller would not be able to set initialization block protection while executing instructions in the initialization block, but would have to do so while executing instructions outside the initialization block, which could open a window of opportunity for an intruder to seize control of the embedded controller and compromise the protected contents of the memory.

Debug Blocking

As may be appreciated, to maintain system security, an external debug function should not be permitted to access an internal secret, e.g., the first data from above, since an attacker could use the debug mechanism to steal it. Thus, in one embodiment, in order to prevent a debug attack, all debug access (for example, a Joint Test Action Group (JTAG) port, a serial debug port, or bus access from a host) may initialize into an inactive state after POR. Debug access may then only be enabled after the secret is secured, e.g., by setting the read-protect bit (e.g., by setting the control value to a masking value). Note that access may be enabled either explicitly by the embedded controller configuring registers through programmed writes, or the read-protect bit itself can be used to enable debug access. In the latter case, all debug access will be blocked when read-protect is disabled (the initial state of read-protect), and debug access enabled when read-protect is enabled (e.g., through one of the processes described herein). Thus, the method may further include disabling debug access in response to the POR, and enabling debug access in response to said disabling access to the memory by the embedded controller.

Thus, various embodiments of the invention described herein may facilitate protection of data and/or program instructions for an embedded microcontroller in a system.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
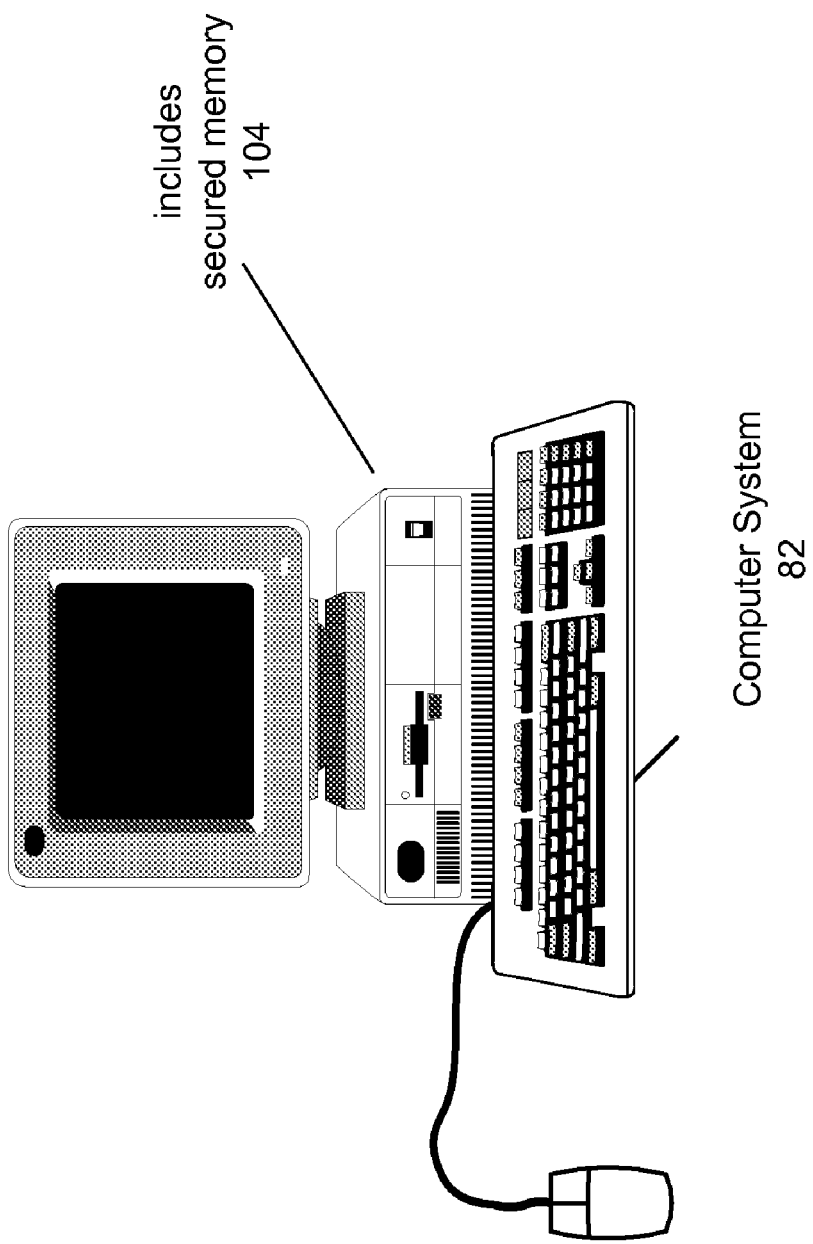
FIG. 1 illustrates an exemplary computer system configured to implement one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 11/848,854 titled "Configurable Signature for Authenticating Data or Program Code," filed Aug. 31, 2007.

Various embodiments of a system and method are presented for securing data or program instructions in a system, e.g., a computer system, where the system includes a main or central processor, i.e., a host processor, and a microcontroller with memory, where the microcontroller performs one or more security operations prior to boot-up of the main processor.

Note that any headings used are for organizational purposes only and are not meant to be used to limit or interpret the description or claims. Furthermore, it should be noted that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

Moreover, as used herein, a "set of instructions" may refer to one or more instructions. More specifically, in some embodiments, "instructions" may refer to programming code, software, and/or functions implemented in the form of a code that is executable by a controller, microprocessor, and/or custom logic circuit adapted to execute these instructions. In some embodiments, these instructions may comprise device drivers, control software, and/or machine code.

As used herein, a "controller" refers to any type of processor, such as a central processing unit (CPU), microprocessor, microcontroller, or embedded controller or microcontroller, among others.

Overview

Various embodiments of the invention described herein may provide protection of data and/or program instructions used to maintain or verify system security.

FIG. 1—Exemplary Computer System

FIG. 1 is a high-level block diagram of an exemplary computer system 82 configured to implement one embodiment of the present invention, specifically to protect data (and/or program instructions), e.g., "secret" data, or simply "a secret), by restricting access to the data during system initialization, e.g., prior to boot-up of the system CPU. The system of FIG. 1 comprises a computer system, e.g., a personal computer (PC), although in other embodiments, the techniques and systems described herein may be implemented in any other systems as desired.

As FIG. 1 shows, the computer system 82 includes a memory 104 that is secured according to embodiments of the present invention. In preferred embodiments, the computer system 82 includes a main or central processor, i.e., a host processor, as well as one or more microcontrollers, e.g., each in a respective system-on-chip (SoC), such as, for example, a keyboard controller for managing or controlling communications between a keyboard and the main processor. The memory is preferably included on the SoC with the embedded controller, and in various embodiments, may be a non-volatile memory, e.g., ROM (read only memory), or a volatile memory, such as RAM, or a register, as desired. Further details regarding exemplary embodiments of the system are provided below with reference to FIGS. 2, 4, and 5.

In preferred embodiments, the secret may be stored in the memory of the SoC (System on Chip) in such a way that software running on the embedded controller in the SoC can access and use the secret, e.g., to verify that the system in which the SoC is located is authorized and has not been modified through tampering, or to enable or disable some aspect of the system, either based on authorization of the secret or using the secret itself to enable the function, among other uses. The requirements for storing the secret may include: 1) the secret must not be revealed to any entity outside of the embedded controller; 2) if it is possible that an entity outside the embedded controller might be able to read or modify memory in the SoC, access to the secret should be restricted so that even the embedded controller cannot read it; and 3) special (and therefore, expensive) hardware technology, e.g., OTP (One Time Programmable) memory or fuses, cannot be used-only standard logic and memory technology are available. Thus, the computer system 82 may include a system operable to manage and protect access to the memory in the SoC.

In one embodiment, the system may include a first memory which stores data, e.g., secret data, such as a key or password for checking or verifying security of the system, a second memory operable to store a first value that prevents access to the first memory, where the second memory includes an input operable to receive a signal indicating a power-on-reset (POR) generated within the system. The system may also include first logic coupled to the first memory and the second memory, where the first logic is operable to control access to the data in the first memory based on the value stored in the second memory. In response to a power-on-reset being generated, the second memory is operable to store a second value, where the first logic enables access to the first memory in response to the second value being stored in the second memory. As noted above, in some embodiments, the system includes an embedded controller coupled to the first memory, where controlling access to the data comprises controlling access by the embedded controller to the data.

In one embodiment, the first logic may be operable to determine if an address generated by the embedded controller is within an initialization address range. The first logic may be operable to enable access to the first memory for addresses generated by the embedded controller within the initialization address range, where, after the embedded controller generates at least one address outside of the initialization address range, the first logic may be operable to disable access to the first memory for subsequent addresses generated by the embedded controller within the initialization address range. For example, in one embodiment, the first logic may include a comparator, where the comparator has a first input operable to receive addresses generated by the embedded controller, and where the comparator is operable to compare the addresses generated by the embedded controller with the initialization address range.

Said in a slightly different way, in one embodiment, the system may include an embedded controller, a first memory coupled to the embedded controller which stores initialization code and/or data for the embedded controller, and a second memory that is operable to store a first value that enables prevention of access to the first memory, where the second memory includes an input operable to receive a signal indicating a power-on-reset generated within the system. The system may also include first logic coupled to the first memory and the second memory, where the first logic is operable to control access to the data in the first memory based on the value stored in the second memory. In response to a power-on-reset being generated, the second memory is operable to store a second value, where the first logic enables access to the first memory in response to the second value being stored in the second memory. The first logic may be operable to determine if an address generated by the embedded controller is within an initialization address range, and enable access to the first memory for addresses generated by the embedded controller within the initialization address range. After the power-on-reset and after the embedded controller generates at least one address outside of the initialization address range, the first logic may be operable to disable access to the first memory for subsequent addresses generated by the embedded controller within the initialization address range. In one embodiment, the first logic may be operable to enable access to the memory for addresses generated outside of the initialization address range.

In other words, upon POR, the system may be operable to enable access to the memory, e.g., by the embedded controller, allowing the embedded controller to execute initialization code from the memory, where the initialization code is within a specified address range. The system may then be configurable to disable access to the memory upon the embedded processor presenting an address out of the address range. When the embedded controller presents an address outside the address range, e.g., when the embedded controller leaves the address range, access to the contents of memory within the address range is blocked, although access to memory outside that range is still allowed.

As an analogy, consider a user turning on electricity in a house (POR of the system) that has a room (memory) containing a document (secret data), where the door to the room unlocks automatically when the electricity is turned on (POR enables access to the memory). The user enters the room and reads the document (embedded controller accesses the memory and executes initialization code), and pushes the lock button on the door (configures the system to disable access to the memory upon the embedded processor presenting an address out of the address range), which doesn't yet lock the user out, since the user is still in the room (embedded processor still accessing memory in the address range). Then, the user leaves the room and shuts the door, thereby locking the door and preventing the user from reentering the room (the embedded processor presents an address out of the address range, and access to the contents of memory within the address range is blocked, although access to memory outside that range is still allowed). The user cannot reenter the room again until the electricity is powered down and powered up again (enable access to the memory in the address range upon another POR).

Thus, access to the specified address range may be limited to the period from directly after POR to when the embedded processor presents an address out of the specified address range, thereby presenting unauthorized access, e.g., tampering or circumvention, with the initialization process for the system.

Specific embodiments of such systems are now described.

Figure 2:
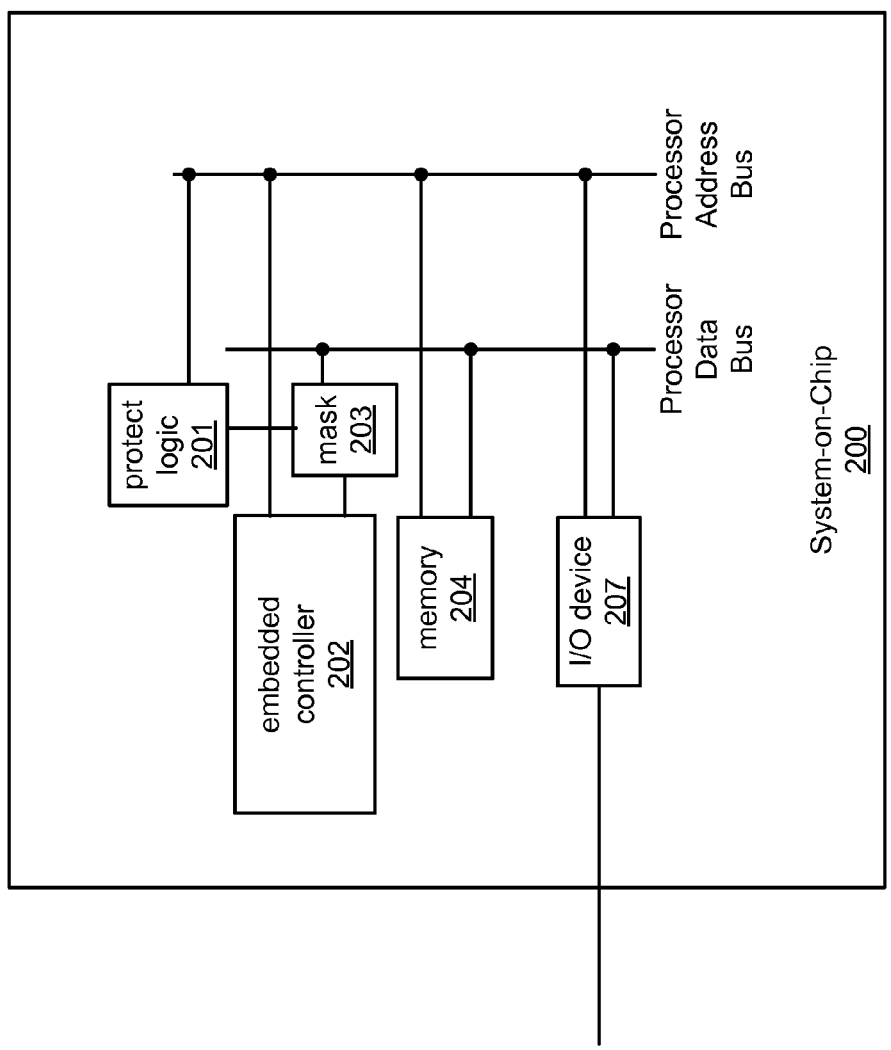
FIG. 2 is an exemplary high-level system block diagram, according to one embodiment of the present invention.

FIG. 2—High-level Block Diagram of Exemplary System

FIG. 2 is a high-level block diagram of an exemplary system, according to one embodiment. More specifically, FIG. 2 illustrates primary components of an exemplary system implementing embodiments of the present invention.

As FIG. 2 shows, the system may include an embedded controller 202 coupled to a memory 204, and may communicate with external systems or components via I/O device 207, which may be coupled to the embedded controller 202 via one or more buses, e.g., the processor data bus and processor address shown. In preferred embodiments, mask logic 203 may be interposed between the embedded controller 202 and the memory 204, e.g., between the embedded controller and the processor data bus. Additionally, in some embodiments, protect logic 201 may also be interposed between the embedded controller 202 and the memory 204, e.g., between the embedded controller and the processor address bus. The mask logic may be operable to mask or pass through data read from the memory 204 based on a control value provided to the mask logic 203, as will be described in more detail below. The protect logic 201 may be operable to determine the control value based on specified conditions of the system, e.g., based on power-on-reset (POR), memory accesses, etc., as desired, as will also be explained in more detail below.

As FIG. 2 indicates, in preferred embodiments, the system may be or include a system-on-chip (SoC) 200, and so the memory, mask, and protect logic 201 may be local to the embedded controller 202.

Figure 3:
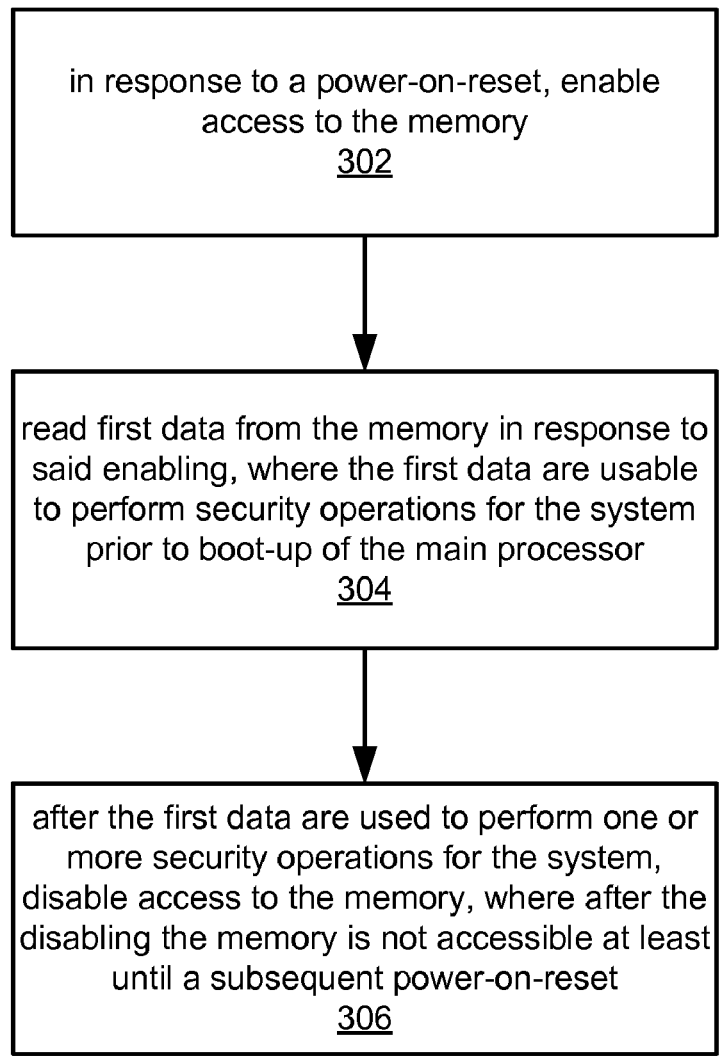
FIG. 3 is a flowchart of a method for securing data for a microcontroller in a system, according to one embodiment.

FIG. 3—Method for Securing Data in a System

FIG. 3 is a high-level flowchart of a method for securing data in a system, e.g., a computer system, that may include a main or host processor, and an embedded processor and memory, e.g., included in an SoC, where the data are useable by the embedded controller to perform security operations, e.g., system verification, login, etc., prior to boot-up of the main or host processor of the system, according to one embodiment. In various embodiments, some of the method elements shown may be performed concurrently, in a different order than shown, or may be omitted. Additional method elements may also be performed as desired. As shown, this method may operate as follows.

In 302, in response to a power-on-reset (POR), access to the memory may be enabled. This enablement may be accomplished via any of a variety of ways. As noted above, and as illustrated in FIG. 2, in one embodiment, the system may include an embedded controller, e.g., an embedded microcontroller, where controlling access to the memory comprises controlling access to the memory by the embedded controller (or other components of the system).

As FIG. 2 also indicates, in some embodiments, access to the memory 104 may be controlled or secured by the protection logic 201 and mask 203, examples of which are described below.

In one embodiment, enabling access by the embedded controller to the memory may include providing a first control value to masking logic coupled to the memory, e.g., interposed between the embedded controller and the memory. The masking logic may be operable to perform a logical operation using the first control value and data read from the memory, where the logical operation leaves the data read from the memory unchanged. In other words, the first control value may be a "pass-through" value that does not mask data read from the memory. For example, in some embodiments, providing the first control value to the masking logic may include a flip-flop receiving the POR and outputting an initial control value in response, an inverter inverting the initial control value to generate the first control value, and the inverter providing the first control value to the masking logic. The masking logic may be or include an AND gate, where the first control value is a pass-through value for the AND gate, and where the masking logic is operable to AND the first control value and data read from the memory, leaving the data read from the memory unchanged.

Figure 4:
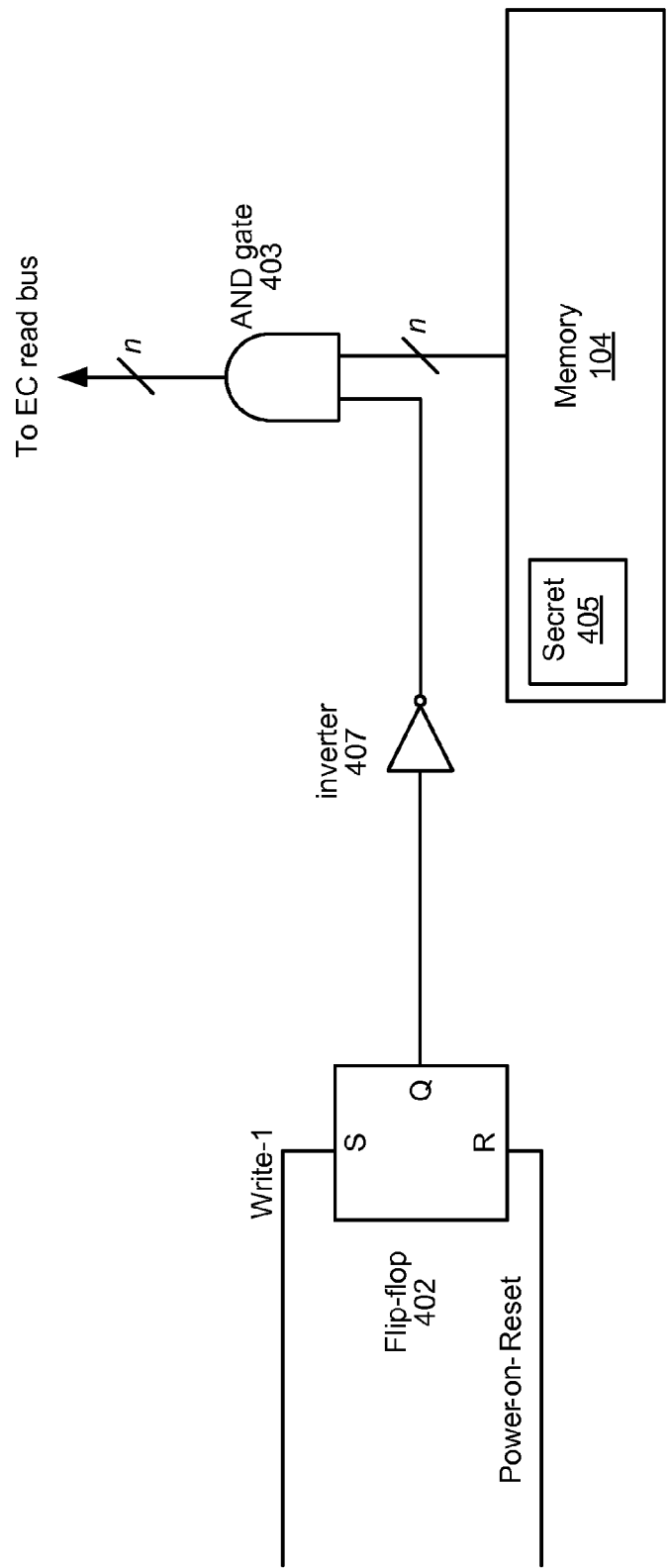
FIG. 4 is an exemplary block diagram of a system for securing data, according to one embodiment.

FIG. 4 is a block diagram of an exemplary interface for controlling access to the memory 104, although it should be noted that in other embodiments, different means or components may be used to perform the functionality described herein.

As FIG. 4 shows, in this embodiment an AND gate 403 (e.g., masking logic) may be interposed between the memory 104 and the embedded controller, more specifically, between the embedded controller and a read bus of the embedded controller, so labeled, e.g., the processor data bus of FIG. 2, whereby the embedded controller performs reads from the memory. The AND gate 403 may be operable to receive two inputs: data from the memory 104, and a control value, e.g., a Boolean control value, e.g., a bit, from the interface that may be used to mask data from the memory 104. As shown, the memory 104 stores data, e.g., a secret 405, that the embedded controller may require to perform security operations for the system, e.g., prior to boot-up of the main processor. As FIG.

4 indicates, the AND gate may be operable to mask (or pass) n-bits of data per operation, i.e., the AND gate may include a plurality of AND gates. More specifically, n bits of data from the memory may be masked through n AND gates each read cycle. Thus, the AND gate 403 may include a plurality of AND gates.

As may be seen, in this embodiment, the interface may generate the control value via flip-flop 402, in this case, a set/reset (SR) flip-flop, which may be referred to as a read-protect flip-flop, and inverter 407, where the flip-flop is operable to receive a power-on-reset (POR), e.g., signal or bit, to reset the flip-flop, as well as a Write-1 (or equivalent) value, e.g., signal or bit, to set the flip-flop. Depending on which signal has been asserted most recently, the flip-flop may output a Boolean value, e.g., a bit, in the following manner. Thus, upon power-on-reset (POR), the flip-flop may be reset, thereby presenting a "0" at output Q of the flip-flop; and upon receiving a Write-1 value, e.g., a "1" (e.g., or other non-zero value), the flip-flop may present a "1" at output Q.

Note that in the embodiment shown, the output bit from Q is inverted before being provided (as the control value) to the AND gate 403. Thus, a POR results in a control value of "0" at the AND gate 403, and Write-1 assertion at the flip-flop results in a control value of "1" at the AND gate 403. The AND gate 403 may then pass or mask data read from the memory based on the control value. For example, in response to POR, the control value presented to the AND gate 403 is "1", which, when ANDed to bits read from the memory 104, e.g., secret 405, leaves the read bits unchanged, thus enabling access to the memory 104. Conversely, in response to Write-1, the control value presented to the AND gate 403 is "0", which, when ANDed to bits read from the memory 104, e.g., secret 405, results in all zeros, thus disabling access to the memory 104. In other words, any data read from the memory 104 gets converted to zeros, thus rendering the read operations by the embedded controller unsuccessful. Of course, equivalent functionality may be achieved via different combinations of logical elements and operations, the above being but one exemplary embodiment of such an interface.

As indicated above, in some embodiments, the embedded controller and the memory may be included in a System-on-Chip (Soc). For example, the embedded controller may be a peripheral device controller for a computer system, e.g., a keyboard controller. In various embodiments, the memory may be or include one or more of: random access memory (RAM), non-volatile memory, e.g., read only memory (ROM), or a register, among other types of memory.

Thus, a POR at flip-flop 402 may enable access to the memory 104, e.g., to secret data 405 stored in the memory 104.

In 304, first data, e.g., the secret data 405, may be read from the memory in response to the enabling of 302, where the first data are usable to perform security operations for the system, e.g., prior to boot-up of the main processor. As noted above, the first data, e.g., secret data 405, may be any type of data useable by the embedded controller to perform security operations for the system. For example, in some embodiments, a vendor of such a system may, as part of the boot sequence of the SoC, wish to verify that other components of the computer system are authorized by the vendor. A method such as password or key exchange may be used, which requires storing some secret key or password on the SoC, i.e., the first data may include a key or password. Thus, for example, in some embodiments, the (secret) data 405 may include a key or password for use in a password or key exchange for verification of system components, or a password for restricted login to the system, e.g., where a user may be required to provide a matching password to initiate boot-up of the main processor, and thus the embedded controller may prompt the user for the password, and initiate the main system boot process upon provision by the user of the correct password. Of course, in other embodiments, the first data may used in and for any security operations desired, i.e., the first data may be any type of data for which protection is desired.

In 306, access to the memory may be disabled, where after disabling the memory is not accessible. For example, in one embodiment, disabling access may include providing a second control value to the masking logic, where the masking logic is operable to perform a logical operation using the second control value and data read from the memory, and where the logical operation masks the data read from the memory. As discussed above, in some embodiments, the system includes an embedded controller, where the masking logic is interposed between the embedded controller and the memory. Thus, in some embodiments, enabling access to the memory includes enabling access to the memory by the embedded controller, reading the first data from memory includes the embedded controller reading the first data from the memory, and disabling access to the memory includes disabling access to the memory by the embedded controller.

As noted above, the masking logic may be or include an AND gate, e.g., interposed between the embedded controller and the memory. In one embodiment, to disable access to the memory the second control value may be a masking value for the AND gate, where the masking logic is operable to AND the second control value and data read from the memory to mask the data read from the memory. In one embodiment, providing the first control value to the masking logic may include a flip-flop (e.g., the flip-flop of 302) receiving a set value and outputting an initial control value in response, an inverter inverting the initial control value to generate the second control value, and the inverter providing the second control value to the masking logic.

Turning again to the example system of FIG. 4, once the secret data 405 (i.e., the first data) have been read from the memory 104, the Write-1 (or equivalent) bit (e.g., a "1") may be written to the flip-flop 402, thereby setting the state of the flip-flop to "1", which may then be output at Q, inverted by inverter 407 (to "0"), and provided to the AND gate 403, after which, as noted above, any data read from the memory 104 may be converted to zeros, thus disabling access, e.g., reads, from the memory 104.

In one embodiment, the embedded controller using the first data to perform one or more security operations for the system may include executing initialization code for the system, and disabling access to the memory may include the embedded controller writing the set value to the flip-flop after executing the initialization code for the system.

Note that access to the memory 104 may remain disabled until another POR, which may again cause access to the memory to be enabled, as described above. Note also that limiting access to the secret data 405 in the manner described above may prevent unauthorized access, e.g., tampering with or circumvention of the system initialization process, e.g., by preventing any agent, internal or external, from accessing the secret data, where the secret data may be required for successful initialization of the system.

Thus, in the system of FIG. 4, the flip-flop (in conjunction with the inverter 407) may provide a read-protect bit (or equivalent) that masks off the secret data once the bit is enabled. In other words, the flip-flop may be reset to the 0 state on POR, which allows the secret to be readable on the EC data bus. Writing a 1 to the read-protect flip-flop sets the flip-flop to the 1 state. Because the reset input of the flip-flop is only connected to the POR circuitry, it will not return to the 0 state as long as power is applied. In the 1 state, the flip-flop may mask off all bits of the secret, so it always reads as 0. Since there is no other way to read the secret, the secret is concealed once the read-protect bit has been set.

Thus, in some embodiments, the control value, which may be referred to herein as a read-protect bit (even if it includes more than a single bit of data), once set, may prevent any access to the first data, e.g., the secret, which may be stored in a portion of an on-chip memory or in a register. The control value (e.g., bit) may be cleared by POR circuitry, and can be set at any time by software. Once set, however, there is preferably no other mechanism to clear it again, other than a full power cycle of the chip, i.e., another POR. Embedded controller initialization code, which is the first code to run on the embedded controller, can use the secret and then lock it by setting the read-protect bit, before there is any opportunity for embedded controller initialization code to be modified (for example, by the host).

Protecting Initialization Code

It should be noted, however, that embodiments of the above method may be used to implement more complex security processes. For example, in some systems, the first data, e.g., the secret, may be held in the same region of memory as initialization code for the system, e.g., in systems in which the secret is programmed into a non-volatile memory after the chip is manufactured, and the chip manufacturer does not know how much of the memory will contain the secret. Additionally, a vendor may want the initialization code itself protected from access by an attacker, since reverse engineering the code may give an attacker hints about how to obtain the secret. In such systems the above method and mechanism may need to be modified.

For example, a primary issue that may need to be addressed is that the code to write the read-protect bit may be in a read-protected region, and so the embedded controller may not be able to execute the instruction following the instruction that sets read-protect, since the above protection scheme would already be in effect. A read-protect-enable bit (or equivalent) may therefore be used, where the read-protect-enable bit (or equivalent) may be writable by software. Note that in this embodiment, the read-protect bit is preferably not writable directly by software, but instead, may be set whenever the read-protect-enable bit is set and the embedded controller executes any code outside of the protected region. As with the method of FIG. 3, once set the read-protect bit cannot be cleared, except via another POR.

Accordingly, below are described embodiments of the above method for protecting initialization code, i.e., that are particularly directed to securing a specified region of memory in a system, and that utilize an extra control bit, e.g., a read-protect-enable value (e.g., a bit or equivalent valued item), to control setting of the read-protect bit. In other words, in the below embodiments, the contents of a memory, e.g., initialization code for the system, e.g., specified by a memory range, may be secured. It should be noted, however, that the embodiments described are meant to be exemplary only, and that the methods described are not limited to using any particular techniques or components, nor to any particular memory or memory contents.

As discussed above, in some embodiments, the system may include an embedded controller. Moreover, in some embodiments, the first data may include initialization code for the system, where the initialization code has an address range. Enabling access to the memory may include enabling access to the address range in the memory, and disabling access to the memory may include disabling access to the address range of the memory. Thus, in some embodiments, the initialization code may be the secret data described above (which may include one or more keys and/or passwords, as well).

In one embodiment, the method of FIG. 3 may further include determining if an address generated by the embedded controller is outside of an initialization address range, and enabling protection of the memory in response to determining that the address generated by the embedded controller is outside of the initialization address range. Note that the enabling protection is performed prior to the disabling access, where the memory is accessible after the enabling protection and prior to the disabling access, and where the disabling access is performed for addresses generated within the initialization address range, wherein said disabling is performed after said enabling protection.

In other words, the enabling protection doesn't actually establish protection of the memory, but rather, configures the system so that under a specified condition, the protection of memory will be established (see the locked door analogy above). The disabling thus prevents the embedded controller from accessing the initialization address range after having generated at least one address outside of the initialization address range. In other words, the condition that actually triggers the disabling of access to the memory in the address range is when the embedded processor reenters the address range after having left it. Note that although access to the memory in the address range is disabled, access to the memory is enabled for addresses generated outside of the initialization address range.

In one embodiment, a read protect enable value may be set in a memory element prior to enabling protection of the memory, where setting the read protect enable value allows the enabling protection of the memory. In other words, a value, such as a bit, may be set that allows for the subsequent enablement of protection (but not the actual protection yet) for the address range. Note that this read protect enable value may be set by the embedded controller while the embedded controller is still operating within the address range. This value may thus be used to set up, or enable, the above protection enablement, which itself puts the system into condition for triggering the actual protection of memory.

Described in a slightly different manner, in one embodiment, providing the second control value to masking logic (see 306 above) may include setting a third control value, e.g., the read-protect-enable bit mentioned above, to enable the providing the second control value, then, subsequent to setting the third control value, determining that the embedded controller is attempting to access the memory outside the address range, and generating an indication that the embedded controller is attempting to access the memory outside the address range. Access to the address range of the memory may then be disabled in response to the third control value and the indication.

For example, an exemplary two instruction code sequence is shown below that would be sufficient to set the read-protect bit:

Protected Region:
STORE Read-Protect-Enable, 1; set the enable bit
JUMP Unprotected_Region; proceed Note that the JUMP to code outside the protected region will set the read-protect bit, and the code, i.e., the secret data, will be protected.

Said another way, the second control value and the indication may be used to control whether and when the specified address range in memory is to be protected. More specifically, upon POR (see 302 above), access by the embedded controller may be enabled, e.g., so that the embedded controller may execute initialization code to check or verify system security prior to boot-up of the main processor or CPU of the system. The embedded controller may then execute (initialization code) program instructions in the specified address range, e.g., may execute some or all of the initialization code. The embedded controller may then set the second control value, e.g., the read-protect-enable bit (or functional equivalent), to enable use of the second control value, e.g., to enable setting the read-protect bit (or functional equivalent), although it should be noted that doing so does not in itself protect the memory, i.e., setting the third control value/read-protect-enable bit does not disable access to the memory, but rather, prepares or enables the system for such disabling. Then, when the embedded controller executes an instruction outside the specified range, this event, in combination with the third control value/read-protect-enable bit, may cause the second control value, e.g., the read-protect bit, to be set, disabling access to the specified address range in memory. Note that preferably, access to memory addresses outside the specified address range is not disabled. For example, in preferred embodiments, if the instruction being executed is outside the address range, the second control value may not be provided to the masking logic. Below are described embodiments of an exemplary detailed system implementing one embodiment of the above memory protection scheme.

Figure 5:
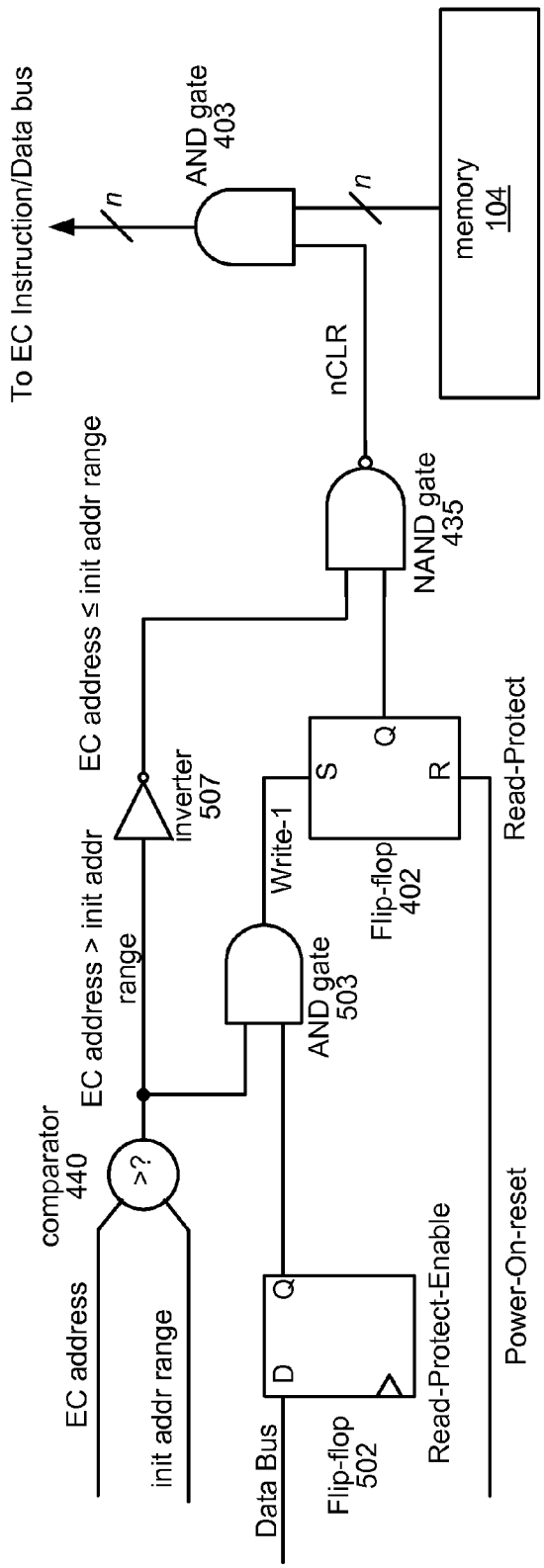
FIG. 5 is an exemplary block diagram of a system for securing a memory, according to one embodiment.

One embodiment of a system implementing this memory protection scheme is illustrated in FIG. 5, where the system of FIG. 5 includes additional circuitry compared to that of FIG. 4. As may be seen, in this embodiment, flip-flop 402 is coupled to the AND gate 403 via a NAND gate 435 (in contrast to the inverter 407 of FIG. 4). The flip-flop 402 may also be coupled to an AND gate 503, which may itself couple to flip-flop 502 and comparator 440, both of which are described in more detail below. The NAND gate 435 may also be coupled to an inverter 507, which may be further coupled to the comparator 440. As FIG. 5 further indicates, the NAND gate 435 may be operable to provide values, e.g., first and second values, to the masking logic, in this case, AND gate 403, to control access to the memory 104, where in FIG. 5, the values are represented by the label "nCLR", i.e., "clear, active low", meaning that when the signal "nCLR" is 0, some other signal is forced to 0 (data are masked, as described below). When "nCLR" is 1, then the other signal is passed unmodified (data are not masked). Operation of the system of FIG. 5 is now described.

In one embodiment, providing the first control value to masking logic includes a flip-flop, e.g., flip-flop 402 of FIG. 5, receiving the POR and outputting an initial control value in response. A NAND gate, e.g., NAND gate 435, may generate the first control value based on the initial control value, and provide the first control value to the masking logic, e.g., AND gate 403. Note that if the initial control value provided to the NAND gate is 0, then the NAND gate will always provide the first control value to the masking logic, regardless of what other values are input to the NAND gate concurrent with the initial control value.

Once access to the memory is enabled, reads from memory in the specified address range may be performed (see 304 above), e.g., initialization code program instructions in the specified address range may be read and executed, e.g., by the embedded controller.

As FIG. 5 shows, the comparator 440 may be operable to determine when a program instruction is out of the specified address range, and generate an indication thereof. More specifically, the comparator may be operable to receive an embedded controller program instruction address, here labeled "EC address", and the specified address range of the initialization code, labeled "initialization address range", and generate an indication as to whether the EC address is in or out of the specified range, e.g., a "1", indicating the EC address is out of range, or a "0", indicating that the EC address is in the specified range. As also shown, this indicator may be provided to the AND gate 503 for control setting the flip-flop 402, and to the NAND gate 435 (after inverting the indicator value, i.e., converting a "1" to a "0", or a "0" to a "1") to control masking, described below.

Regarding disabling access to the memory, in one embodiment, providing the second control value to the masking logic (see 306) may include a flip-flop, e.g., flip-flop 402, receiving a set value and outputting an initial control value in response, the NAND gate, e.g., NAND gate 435, generating the second control value based on the initial control value and the indication, and the NAND gate providing the second control value to the masking logic.

In some embodiments, the flip-flop receiving the set value may include setting another flip-flop, e.g., flip-flop 502, to the third control value, e.g., setting the read-protect-enable bit (or equivalent); an AND gate, e.g., AND gate 503, receiving the third control value from the other flip-flop (e.g., flip-flop 502); the AND gate receiving the indication, and generating the set value based on the third control value and the indication; and the flip-flop receiving the set value from the AND gate. As noted above, setting this third control value may allow the system to subsequently protect the memory, e.g., when the comparator 440 determines that the EC address is out of range.

Thus, for example, once the third control value, e.g., the read-protect-enable bit (or equivalent) has been set, then, when the comparator 440 indicates that the EC address is out of the specified address range, the NAND gate generating the second control value based on the initial control value and the indication may include: an inverter e.g., inverter 507, inverting the indication, and providing the inverted indication to the NAND gate; and the NAND gate NANDing the initial control value and the inverted indication to generate the second control value, which may then be provided to the masking logic, e.g., AND gate 403, to mask data read from the memory 104.

Thus, summarizing the above, upon POR, e.g., start-up or reset, access to the memory may be enabled, e.g., allowing the embedded controller to execute initialization code instructions from a specified address range, e.g., to perform any of various security operations. Then, in response to both a read-protect-enable bit being set and encountering a program instruction with an address outside the specified range, access to the memory within the specified range may be disabled, although access to instructions with addresses outside this range may still be accessed. Access to the specified range may only be enabled by another POR.

Said another way, in the system of FIG. 5, in one embodiment, the read-protect bit is only set when the read-protect-enable bit is set and the embedded controller issues an address that is outside the initialization block of memory. Once the read-protect bit is set, it may remain set until the next power cycle. When set, the read-protect bit may block any read of the memory 104 (embedded controller memory) at an address within the initialization block. In this embodiment, n bits of data from the memory 104 are masked through n AND gates. When the read-protect bit is set and the EC address lies within the initialization block address range, the output of the NAND gate, e.g., nCLR, will be 0. The signal nCLR may therefore mask off all data bits read from the memory whenever the EC address is within the initialization block address range.

In one use of this mechanism, the embedded controller, while executing within the initialization block, may set the read-protect-enable bit. The next instruction, which is still within the initialization block range, may be a jump to a location that is outside the initialization block range. Once the jump is executed the initialization block may be locked or protected, as described above. Note that without the read-protect-enable bit being set, the embedded controller would not be able to set initialization block protection while executing instructions in the initialization block, but would have to do so while executing instructions outside the initialization block, which could open a window of opportunity for an intruder to seize control of the embedded controller and compromise the protected contents of the memory.

Debug Blocking

As may be appreciated, to maintain system security, an external debug function should not be permitted to access an internal secret, e.g., the first data from above, since an attacker could use the debug mechanism to steal it. Thus, in one embodiment, in order to prevent a debug attack, all debug access (for example, a Joint Test Action Group (JTAG) port, a serial debug port, or bus access from a host) may initialize into an inactive state after POR. Debug access may then only be enabled after the secret is secured, e.g., by setting the read-protect bit (e.g., by setting the control value to a masking value). Note that access may be enabled either explicitly by the embedded controller configuring registers through programmed writes, or the read-protect bit itself can be used to enable debug access. In the latter case, all debug access will be blocked when read-protect is disabled (the initial state of read-protect), and debug access enabled when read-protect is enabled (e.g., through one of the processes described herein). Thus, the method may further include disabling debug access in response to the POR, and enabling debug access in response to said disabling access to the memory by the embedded controller.

Note that embodiments of the above solutions may avoid the use of complex cryptographic mechanisms, which may reduce the need for special purpose hardware, and make significantly lower demands on the computational capabilities of an embedded controller. For example, as discussed above, the special hardware required may be limited to a few simple gates, flip flops, and an inverter.

Thus, using embodiments of the above-described method, access to data and/or program instructions may be controlled or managed to prevent unauthorized access to, use or circumvention of, or tampering with, secret data, e.g., a key, password, or even initialization code, for use in the initialization process for the system, e.g., to maintain or verify security of the system, prior to boot-up of a main processor in a system.

We claim:

1. A method for protecting data in a system, the method comprising:
   in response to a power-on-reset, enabling access to a memory of the system, wherein said enabling access to the memory comprises:
      providing a first control value to masking logic coupled to the memory, wherein the masking logic is configured to perform a first logical operation using the first control value and second data read from the memory, and wherein the first logical operation leaves the second data read from the memory unchanged;
   reading first data from the memory in response to said enabling, wherein the first data are usable to perform security operations for the system prior to boot-up of a main processor in the system, wherein the system comprises an embedded controller, wherein the first data comprises initialization code for the system, wherein the initialization code has an address range, wherein said enabling access to the memory comprises enabling access to the address range in the memory;
   after the first data are used to perform one or more security operations for the system, disabling access to the memory, wherein after said disabling the memory is not accessible at least until a subsequent power-on-reset, wherein said disabling access to the memory comprises:
      providing a second control value to the masking logic, wherein the masking logic is configured to perform a second logical operation using the second control value and second data read from the memory, wherein the second logical operation masks the second data read from the memory, wherein said disabling access to the memory comprises disabling access to the address range of the memory, and wherein said providing the second control value to the masking logic comprises:
         setting a third control value to enable said providing the second control value; and
         subsequent to said setting the third control value, determining that the embedded controller is attempting to access the memory outside the address range, and generating an indication that the embedded controller is attempting to access the memory outside the address range; and
      disabling access to the address range of the memory in response to said third control value and said indication.

2. The method of claim 1, wherein the first data comprises one or more of:
   a password; or
   a key.

3. The method of claim 1, further comprising:
   using the first data to perform one or more security operations for the system, including executing initialization code for the system; and
   wherein said disabling access to the memory comprises writing a set value to a memory element after executing the initialization code for the system to disable access to the memory.

4. The method of claim 1, further comprising:
   wherein said enabling access to the memory comprises enabling access to the memory by the embedded controller, wherein said reading the first data from the memory comprises the embedded controller reading the first data from the memory, and wherein said disabling access to the memory comprises disabling access to the memory by the embedded controller.

5. The method of claim 4, further comprising:
   determining if an address generated by the embedded controller is outside of the address range;
   enabling protection of the memory in response to determining that the address generated by the embedded controller is outside of the address range, wherein said enabling protection is performed prior to said disabling access, wherein the memory is accessible after said enabling protection and prior to said disabling access;
   wherein said disabling access is performed for addresses generated within the address range, wherein said disabling is performed after said enabling protection.

6. The method of claim 5,
   wherein said disabling prevents the embedded controller from accessing the address range after having generated at least one address outside of the address range.

7. The method of claim 5,
wherein access to the memory is enabled for addresses generated outside of the address range.

8. The method of claim 5, further comprising:
setting a read protect enable value in a memory element prior to said enabling protection of the memory, wherein said setting the read protect enable value allows said enabling protection of the memory.

9. The method of claim 1, further comprising:
disabling debug access in response to the POR; and
enabling debug access in response to said disabling access to the memory by the embedded controller.

10. The method of claim 1, wherein the embedded controller is a peripheral device controller for a computer system.

11. The method of claim 1, wherein the embedded controller and the memory are comprised in a System-on-Chip (SoC).

12. A system, comprising:
a first memory which stores data;
an embedded controller coupled to the first memory;
a second memory, wherein the second memory is configured to store a first value that prevents access to the first memory, wherein the second memory includes an input configured to receive a signal indicating a power-on-reset generated within the system;
first logic coupled to the first memory and the second memory, wherein the first logic is configured to control access to the data in the first memory based on the first value stored in the second memory;
wherein the first logic is configured to determine if an address generated by the embedded controller is within an initialization address range;
wherein the first logic is configured to enable access to the first memory for addresses generated by the embedded controller within the initialization address range;
wherein, after the embedded controller generates at least one address outside of the initialization address range, the first logic is configured to disable access to the first memory for subsequent addresses generated by the embedded controller within the initialization address range,
wherein in response to a power-on-reset being generated, the second memory is configured to store a second value, wherein the first logic enables access to the first memory in response to the second value being stored in the second memory.

13. The system of claim 12,
wherein controlling access to the data comprises controlling access by the embedded controller to the data.

14. The system of claim 12, wherein the first logic comprises:
a comparator, wherein the comparator has a first input configured to receive addresses generated by the embedded controller, wherein the comparator is configured to compare the addresses generated by the embedded controller with the initialization address range.

15. A system, comprising:
an embedded controller;
a first memory coupled to the embedded controller which stores initialization code and/or data for the embedded controller;
a second memory, wherein the second memory is configured to store a first value that enables prevention of access to the first memory, wherein the second memory includes an input configured to receive a signal indicating a power-on-reset generated within the system;
first logic coupled to the first memory and the second memory, wherein the first logic is configured to control access to the data in the first memory based on the first value stored in the second memory;
wherein in response to a power-on-reset being generated, the second memory is configured to store a second value, wherein the first logic enables access to the first memory in response to the second value being stored in the second memory.
wherein the first logic is configured to determine if an address generated by the embedded controller is within an initialization address range;
wherein the first logic is configured to enable access to the first memory for addresses generated by the embedded controller within the initialization address range;
wherein, after the power-on-reset and after the embedded controller generates at least one address outside of the initialization address range, the first logic is configured to disable access to the first memory for subsequent addresses generated by the embedded controller within the initialization address range.

16. The system of claim 15,
wherein the first logic is configured to enable access to the memory for addresses generated outside of the initialization address range.

17. A method for protecting data in a system, the method comprising:
in response to a power-on-reset, enabling access to a memory of the system, wherein the system comprises an embedded controller, wherein said enabling access to the memory comprises enabling access to the memory by the embedded controller;
reading first data from the memory in response to said enabling, wherein the first data are usable to perform security operations for the system prior to boot-up of a main processor in the system, wherein said reading the first data from memory comprises the embedded controller reading the first data from the memory;
after the first data are used to perform one or more security operations for the system, disabling access to the memory, wherein after said disabling the memory is not accessible at least until a subsequent power-on-reset (POR), and wherein said disabling access to the memory comprises disabling access to the memory by the embedded controller;
determining if an address generated by the embedded controller is outside of an initialization address range;
enabling protection of the memory in response to determining that the address generated by the embedded controller is outside of the initialization address range, wherein said enabling protection is performed prior to said disabling access, wherein the memory is accessible after said enabling protection and prior to said disabling access;
wherein said disabling access is performed for addresses generated within the initialization address range, wherein said disabling is performed after said enabling protection.

18. The method of claim 17, wherein the first data comprises one or more of:
a password; or
a key.

19. The method of claim 17, further comprising:
using the first data to perform one or more security operations for the system, including executing initialization code for the system; and
wherein said disabling access to the memory comprises writing a set value to a memory element after executing the initialization code for the system to disable access to the memory.

20. The method of claim 17,
wherein said disabling prevents the embedded controller from accessing the initialization address range after having generated at least one address outside of the initialization address range.

21. The method of claim 17,
wherein access to the memory is enabled for addresses generated outside of the initialization address range.

22. The method of claim 17, further comprising:
setting a read protect enable value in a memory element prior to said enabling protection of the memory, wherein said setting the read protect enable value allows said enabling protection of the memory.

23. The method of claim 17, further comprising:
disabling debug access in response to the POR; and
enabling debug access in response to said disabling access to the memory by the embedded controller.

24. The method of claim 17, wherein the embedded controller is a peripheral device controller for a computer system.

25. The method of claim 17, wherein the embedded controller and the memory are comprised in a System-on-Chip (SoC).

* * * * *